US009268627B2

United States Patent
Kraipak et al.

(10) Patent No.: US 9,268,627 B2
(45) Date of Patent: Feb. 23, 2016

(54) PROCESSOR HANG DETECTION AND RECOVERY

(71) Applicants: Waseem Kraipak, Maharashtra (IN); Sukanto Ghosh, Maharashtra (IN)

(72) Inventors: Waseem Kraipak, Maharashtra (IN); Sukanto Ghosh, Maharashtra (IN)

(73) Assignee: Applied Micro Circuits Corporation, Santa Clara, CA (US)

( * ) Notice: Subject to any disclaimer, the term of this patent is extended or adjusted under 35 U.S.C. 154(b) by 145 days.

(21) Appl. No.: 13/838,440

(22) Filed: Mar. 15, 2013

(65) Prior Publication Data

US 2014/0281695 A1    Sep. 18, 2014

Related U.S. Application Data

(63) Continuation-in-part of application No. 13/803,906, filed on Mar. 14, 2013.

(51) Int. Cl.
G06F 11/00 (2006.01)
G06F 11/07 (2006.01)

(52) U.S. Cl.
CPC ........ G06F 11/0766 (2013.01); G06F 11/0721 (2013.01); G06F 11/0757 (2013.01); G06F 11/0778 (2013.01)

(58) Field of Classification Search
CPC ............ G06F 11/1402; G06F 11/1405; G06F 11/1407; G06F 11/1446; G06F 11/1448; G06F 11/1474; G06F 11/0766; G06F 11/0721; G06F 11/0757; G06F 11/0778; G06F 11/0772; G06F 11/0775
USPC ......................................................... 714/10
See application file for complete search history.

(56) References Cited

U.S. PATENT DOCUMENTS

| | | | |
|---|---|---|---|
| 5,838,897 A | 11/1998 | Bluhm et al. | |
| 5,889,988 A | 3/1999 | Held | |
| 6,314,530 B1 | 11/2001 | Mann | |
| 6,324,684 B1 | 11/2001 | Matt et al. | |
| 6,857,084 B1 * | 2/2005 | Giles | 714/35 |
| 7,404,178 B2 | 7/2008 | Cepulis | |
| 7,412,624 B1 | 8/2008 | Draper | |
| 7,996,722 B2 | 8/2011 | Burdick et al. | |
| 8,069,371 B2 | 11/2011 | Sengupta et al. | |
| 8,088,011 B2 | 1/2012 | Russell et al. | |
| 8,095,821 B2 | 1/2012 | Mayer et al. | |

(Continued)

OTHER PUBLICATIONS

Non-Final Office Action for U.S. Appl. No. 13/803,906 Dated Dec. 23, 2014, 17 pages.

(Continued)

*Primary Examiner* — Bryce Bonzo
*Assistant Examiner* — Anthony J Amoroso
(74) *Attorney, Agent, or Firm* — Amin, Turocy & Watson, LLP

(57) ABSTRACT

Various aspects provide forced halt functionality for a processor to facilitate troubleshooting of processor hang situations. In the event that the processor initiates a transaction that does not receive a completion acknowledgement, halt detection logic can initiate a forced halt sequence that causes the processor to abort all pending transactions and transition to a debug state so that the internal state of the processor can be viewed. In addition, the processor can maintain a record of the processor state at the time that the hung transaction was dispatched, which can be viewed during debug mode to facilitate determining a cause of the hung transaction.

20 Claims, 12 Drawing Sheets

(56) References Cited

U.S. PATENT DOCUMENTS

| | | |
|---|---|---|
| 8,370,807 B2 | 2/2013 | Campbell et al. |
| 2003/0163743 A1 | 8/2003 | Endo |
| 2005/0131584 A1 | 6/2005 | Law et al. |
| 2005/0273580 A1 | 12/2005 | Chaudhry et al. |
| 2012/0089819 A1* | 4/2012 | Chaudhry et al. ............ 712/214 |
| 2014/0052966 A1* | 2/2014 | Vahidsafa et al. ............ 712/220 |

OTHER PUBLICATIONS

Final Office Action for U.S. Appl. No. 13/803,906 dated Jul. 15, 2015, 16 pages.

\* cited by examiner

HALT DETECTION AND FORCED HALT STATE MACHINE

PROCESSOR HANG DETECTION AND RECOVERY

REFERENCE TO RELATED APPLICATIONS

This application is a continuation-in-part of U.S. patent application Ser. No. 13/803,906, entitled "DEBUGGING PROCESSOR HANG SITUATIONS USING AN EXTERNAL PIN," which was filed on Mar. 14, 2013. The entirety of this related application is incorporated herein by reference.

TECHNICAL FIELD

The subject disclosure relates generally to processor debugging, and more particularly to techniques for escaping from processing hang situations when an external debugger is attempting to view internal processor states.

BACKGROUND

Many processors operate according to a cycle whereby program instructions are fetched from memory, decoded, and dispatched to one or more functional units, which perform operations specified by the instructions. The processor may track pending instructions that have been dispatched and are awaiting execution by the functional units. For example, when the processor dispatches an instruction of execution, a record of the pending instruction (or transaction) may be stored in an instruction window until the functional unit indicates that all necessary operations for the instruction have been completed. Upon receipt of this acknowledgement, the processor clears the pending instruction from the instruction window. If new instructions are fetched, decoded, and dispatched while all functional units are busy processing other instructions, the processor queues the new instructions in the instruction window to await execution.

During building and testing of a new system (e.g., a new motherboard or system-on-chip), a system designer may wish to initiate an external debug event in order to halt the processor and place the processor in a debug state so that the internal state of the processor (e.g., the general purpose and system registers) can be viewed. In response to such an external debug event, the processor typically waits until all pending transactions have completed execution before entering the debug state.

However, there may be circumstances in which the processor is not able to complete an outstanding transaction, and the recipient of the pending transaction (e.g., the functional unit) does not reply with an appropriate acknowledgement (ACK) or negative acknowledgement (NACK) in response to the transaction initiated by the processor. As a result, the transaction remains pending indefinitely, a situation referred to herein as "processor hang." If an external debug event is received while in this hung state, the processor fails to enter the debug state, since the processor continues to wait for completion of the hung transaction. Consequently, the internal state of the processor is not available to the user. Moreover, the processor may not contain necessary information regarding the cause of the hung state.

The above-described description is merely intended to provide a contextual overview of current techniques and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a processor can include forced halt functionality that forces the processor to enter a debug state by aborting any pending non-acknowledged ("in-flight") transactions. To this end, the processor or an associated component can include detection logic that detects a condition indicative of a hung transaction. In response to a determination that a hung transaction is preventing the processor from entering a requested debug mode, the halt detection logic can cause the processor to abort the pending transaction and transition into debug mode, allowing a user to view internal state information for the processor. Thus, a processor according to various aspects described herein can automatically recover from a hung transaction without additional intervention by the user. In addition, the halt detection logic can set an indication bit if the processor was forced to recover from a possible hung transaction, thereby alerting the user that the processor was forced to halt abnormally in response to a detected hung state.

In addition, to facilitate troubleshooting of a hung transaction while in the debug state, one or more example embodiments can include modified instruction window logic—referred to herein as a scoreboard—that logs, for each dispatched instruction, the machine state of the processor at the time the instruction was dispatched. The scoreboard logic can also log other information for each dispatched instruction, including but not limited to a current program counter value. Thus, when the processor has been forced into debug state by the forced halt functionality described above, the user can view the machine states, current program counters, and/or other information for each aborted (presumed hung) transaction to facilitate troubleshooting the circumstances and causes of the failed transactions.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
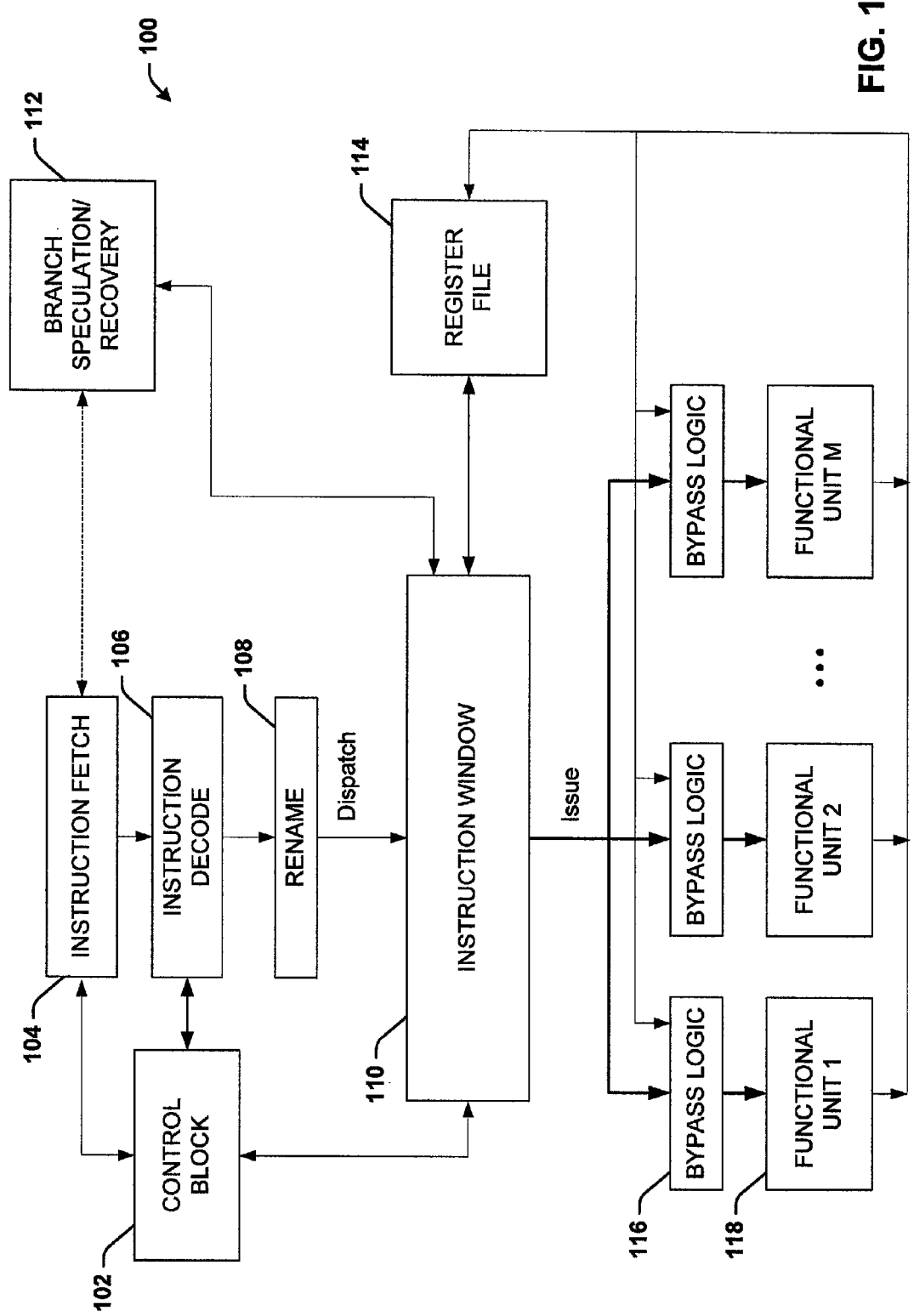
FIG. 1 is a block diagram illustrating an example, non-limiting processor design.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various aspects of the present disclosure provide on-chip processor functionality that forces a processor into a debug state even if one or more pending transactions are awaiting completion. To this end, the processor can include on-chip halt detection logic that detects a condition suggesting that a pending transaction may be hung and is preventing the processor from transitioning to the debug state. In response to this determination, the halt detection logic can cause the processor to abort pending processor transactions (e.g., instructions that have been dispatched to the instruction window for execution but which have not yet received a response) and transition to a debug state so that a system designer can view an internal state of the processor (e.g. general purpose registers, system registers, etc.).

In another aspect, some embodiments can also support logging of processor state data associated with each instruction dispatched to the instruction window. For example, when an instruction has been fetched, decoded, and dispatched to the instruction window, the processor can also record the current machine state of the processor at the time the instruction was dispatched, a current program counter value (or instruction pointer value) at the time the instruction was dispatched, or other information indicative of the processor's state at the time the instruction was dispatched. This processor state logging feature can work in coordination with the forced halt functionality described above. For example, when the forced halt functionality is initiated by the processor's halt detection logic, any pending transactions in the instruction window (including hung transactions that have not received a completion acknowledgement) will be aborted and the processor will be forced into the debug state. In addition, the processor state information recorded for each pending transaction (e.g., machine state, program counter value, etc.) will be logged in the processor or in an associated memory so that the user can view this information during debug. This record of the processor's state at the time a hung transaction was dispatched can assist system designers to ascertain a root cause or system condition that resulted in the hung transaction. These features will be discussed in more detail below.

FIG. 1 illustrates a block diagram of an example processor design 100 in which aspects of the present innovation can be implemented. Although the example processor of FIG. 1 is depicted as an out-of-order speculative processor design having particular functional elements, it is to be appreciated that aspects of the present disclosure can be incorporated in substantially any type of processor design, and are not limited to inclusion in the types of processor designs described herein. In an example application, processor design 100 may be implemented as part of a System-on-Chip (SoC). The functional blocks illustrated in FIG. 1 can respectively comprise hardware, software, or a combination of hardware and software implemented as a computer processing device.

Example processor design 100 includes an instruction fetch block 104 and an instruction decode block 106 that, respectively, fetch and decode instructions in accordance with a current program counter (PC) maintained by control block 102. In some scenarios, the instruction fetch block 104 may prefetch instructions per commands received from a branch speculation/recovery block 112. Rename block 108 can perform any necessary register renaming, and the fetched and decoded instruction can then be dispatched to an instruction window 110. Instruction window 110 acts as a buffer in which pending instructions (also referred to as transactions) or instructions awaiting execution are tracked. Instructions dispatched to the instruction window await execution by one or more functional units 118. For example, when the instruction window 110 receives an indication that one of the functional units 118 is ready to execute an instruction awaiting execution, and the instruction window determines that all necessary operands for executing the instruction are ready, the instruction window 110 will pass the instruction (translated into machine-language by the control block 102) to the functional unit 118, which performs the operations (e.g., operations associated with a load store instruction) and/or calculations specified by the instruction. Each functional unit 118 may have associated bypass logic 116 to reduce latency and improve performance. Register file 114 comprises the set of general purpose registers in which data is temporarily stored in connection with dispatching and execution of processor transactions.

Figure 2:
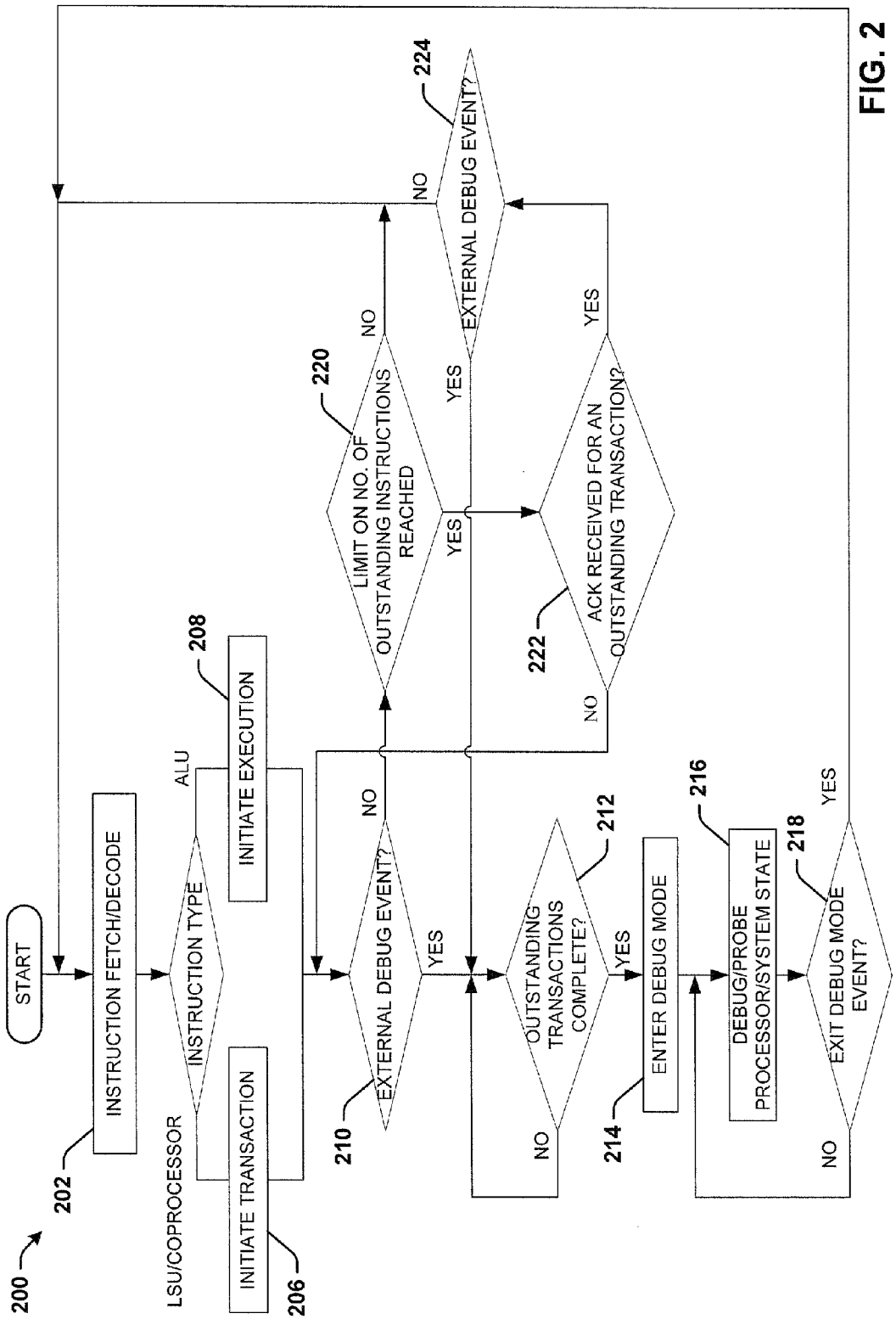
FIG. 2 illustrates a flow diagram of an example operational sequence associated with an example processor design.

FIG. 2 is a flowchart 200 illustrating processor state transitions associated with the example processor design. Initially, at 202, the processor fetches and decodes an instruction as directed by the current program counter (PC). Depending on the type of instruction, a Load Store Unit (LSU)/Co-processor transaction may be initiated at 206 or an arithmetic logic unit (ALU) instruction (which can perform arithmetic logic, multiplication, division, and/or other complex computations) may be initiated at 208. In either case, the fetched and decoded instruction is dispatched to the instruction window to await processing.

At 210, a determination is made regarding whether an external debug event has been initiated. Such debug events can be initiated, for example, via a debug port of the motherboard or SoC on which the processor is installed. If no external debug event has been initiated at 210, normal (non-debug) processing continues at step 220, where a determination is made regarding whether a limit on the number of outstanding instructions in the instruction window has been reached. If this limit has not been reached, processing returns to step 202, and another instruction is fetched and decoded. Alternatively, if the limit on the number of outstanding instructions has been reached at step 220, the processor waits for an acknowledgement (ACK) to be received at step 222 (e.g., from one of the functional units 118) indicating that an outstanding transaction has been completed. If, no ACK for an outstanding transaction is received at 222, the processor continues to cycle through steps 210, 220, and 222 until either an ACK is received at 222 or an external debug event is initiated at 210. If an ACK is received at 222, and no external debug event has been initiated at 224, the cycle returns to step 202, and the processor fetches and decodes another instruction.

If an external debug event is initiated at 210 or 224, the processor begins a sequence to place the processor in debug mode. Typically, before the processor can be placed in debug mode, all pending transactions must be completed and cleared from the instruction window. Accordingly, at 212, a determination is made regarding whether all outstanding transactions have been completed (e.g., have all pending transactions received ACKs from their respective functional blocks). If there are pending transactions remaining in the instruction window ("No" at step 212), the processor continues monitoring for ACKs that indicate completion of the respective transactions. If all transactions are complete ("Yes" at 212), the processor enters the debug state at 214. Placing the processor in the debug state is also referred to as halting the processor. Once the processor is in the debug state, a user can probe and investigate the processor's internal system state using a debug application connected to the debug port. When finished examining the processor, the user can initiate an "exit debug mode" event at 218, which causes the processor to exit the debug state and resume normal processing.

Although the sequence described above may be sufficient for halting the processor under normal conditions, there may be circumstances in which the processor is not able to complete an outstanding transaction after the external debug event has been initiated. For example, a load store unit (LSU) instruction may generate an invalid system address for which the bridge agent does not respond with an appropriate error message (e.g., a negative acknowledgement, or NACK). In another example, a dispatched transaction may experience deadlock because execution of the transaction under certain conditions creates a corner case not anticipated by the system designer. If no error handling or time-out condition has been written for such a situation, no error signaling will be received and the instruction may remain pending indefinitely. In yet another example, a transaction may send a snoop to a caching agent which has not been activated. As a result, the transaction will be waiting indefinitely for a response from the inactive caching agent, resulting in a hung state.

In scenarios such as those described above, the recipient of the pending transaction (e.g., the functional unit) will not reply with an appropriate acknowledgement (ACK) or negative acknowledgement (NACK) in response to the transaction initiated by the processor. As a result, the transaction will remain pending, causing the "no" loop of step 212 to execute indefinitely, a situation referred to herein as "processor hang." If an external debug event is received while in this hung state, the processor will typically fail to enter the debug state. Consequently, the internal state of the processor will not be available to the user. Moreover, the user may have no information regarding the cause of the processor hang, rendering troubleshooting difficult.

Figure 3:
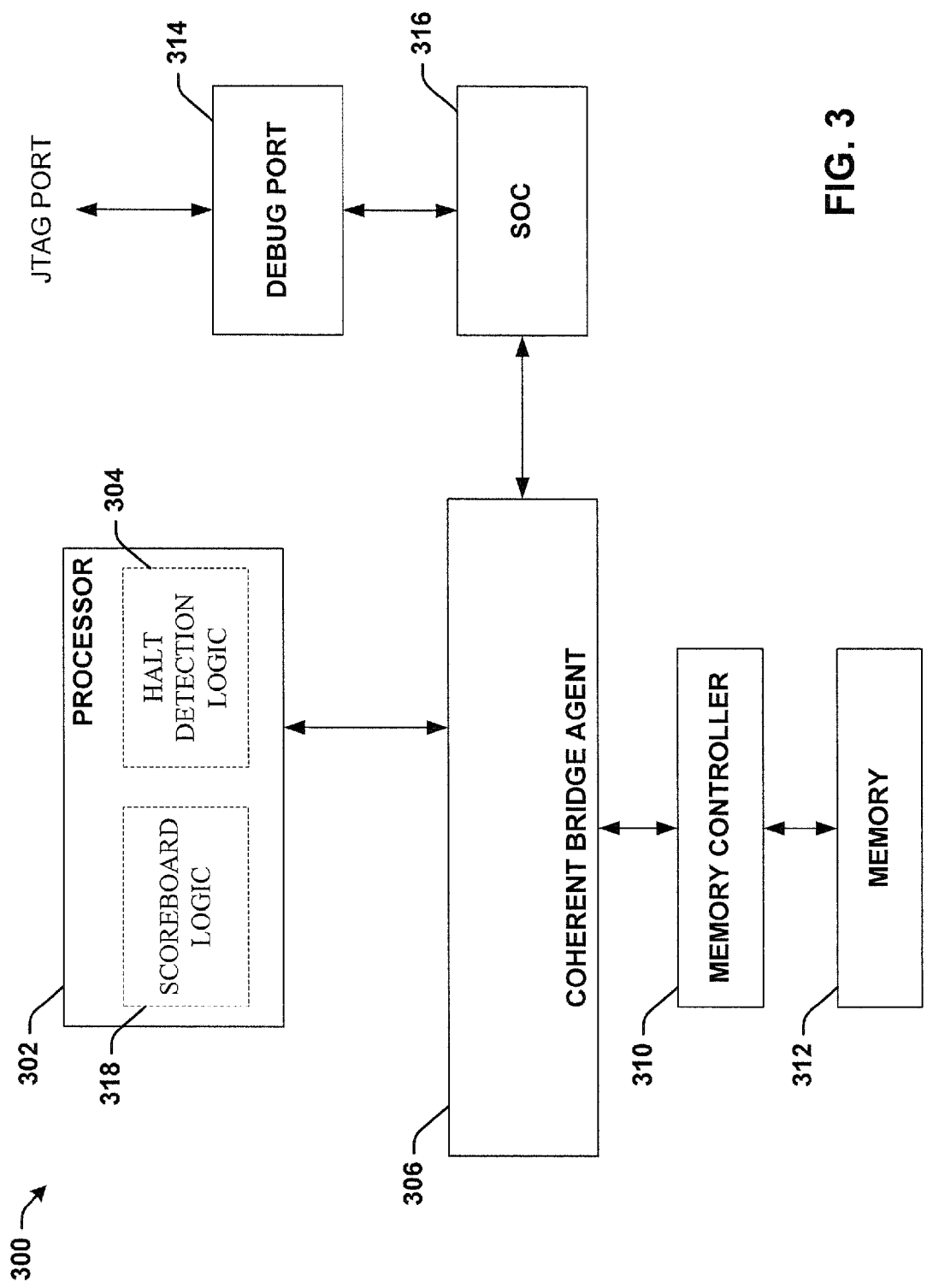
FIG. 3 is a block diagram illustrating an example, non-limiting embodiment of a processor system that utilizes forced halt functionality in accordance with one or more aspects described herein.

To address these issues, one or more embodiments described herein provide a processor having on-chip forced halt functionality. FIG. 3 illustrates an exemplary processor system 300 that utilizes forced halt functionality in accordance with one or more aspects of this disclosure. System 300 comprises a processor 302, a memory 312, and a memory controller 310 that controls movement of data to and from memory 312. The processor 302 includes scoreboard logic 318 that tracks outstanding processes awaiting completion. System 300 can also include a coherent bridge agent 306, which manages communication between motherboard devices of the system 300. The processor 302, memory controller 310, memory 312, and coherent bridge agent 306 may operate in conjunction with an SoC 316. System 300 may also include a debug port 314 (e.g., a Joint Test Action Group—or JTAG—port) which allows a system designer to interface with processor 302 or other components of system 300 using a debugging interface to view registers and internal states of the system 300.

In accordance with various aspects described herein, processor 302 can include on-chip halt detection logic 304 that initiates a forced halt sequence in the processor under certain conditions indicative of a hung transaction, to be described in more detail below. When the forced halt sequence is initiated, processor 302 is forced into the debug state by aborting any pending (non-acknowledged) transactions remaining in the instruction window and placing the processor in the debug state. This can include aborting any hung transactions that may be awaiting completion acknowledgements. In some embodiments, after the pending transactions have been aborted in response to the forced halt sequence initiated by the halt detection logic 304, processor 302 will then revert to a state associated with an earliest non-acknowledged transaction, as determined by referencing the processor's scoreboard logic 318.

Figure 4:
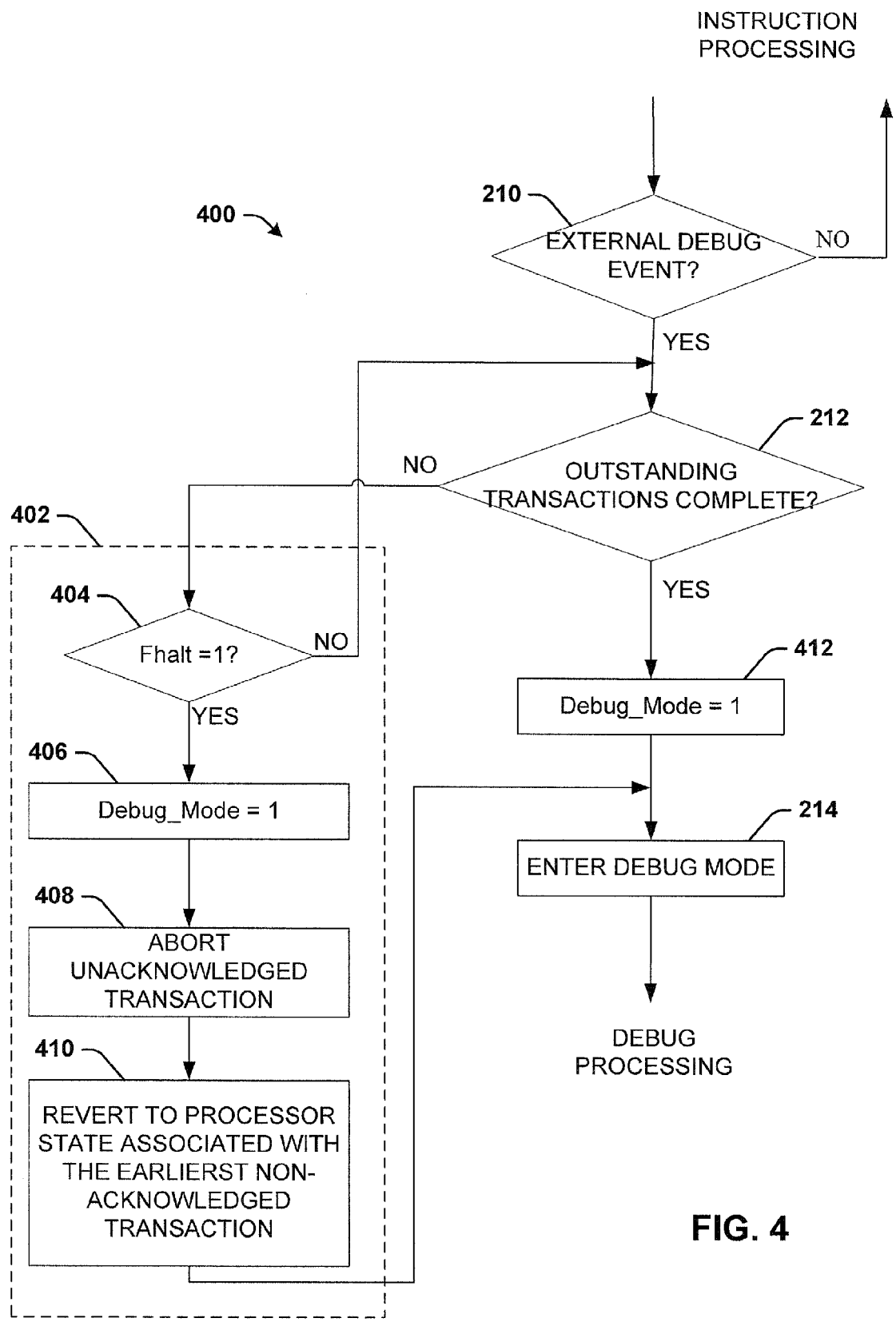
FIG. 4 illustrates a flow diagram of an example, non-limiting operational sequence for an example processor system that utilizes forced halt functionality according to one or more aspects described herein.

FIG. 4 is a flowchart 400 illustrating an example operating sequence for a processor system that utilizes on-chip forced halt functionality according to one or more embodiments of this disclosure. Flowchart 400 is segment of a modified version of flowchart 200 depicted in FIG. 2, and differs from flowchart 200 by the addition of a forced halt sequence 402. Similar to flowchart 200 of FIG. 2, flowchart 400 executes normal instruction processing until an external debug event is detected at 210. When an external debug event is initiated at 210, a determination is made at 212 regarding whether all outstanding transactions have completed (e.g., whether ACK signals have been received for all pending transactions). Similar to flowchart 200, if it is determined that all outstanding transactions have been completed, the processor sets a debug mode register (e.g., Debug_Mode) at 412 and enters debug mode at 214.

Alternatively, if a determination is made at 212 that there are remaining transactions outstanding (as determined, for example, by referencing the processor's instruction window), the process moves to step 404, where a determination is made regarding whether the on-chip forced halt sequence has been initiated. The processor can make this determination, for example, by examining a forced halt bit (e.g., Fhalt) controlled by halt detection logic 304 embedded in the processor, as will be explained in more detail below. If the Fhalt bit is not set to 1 at 404, the forced halt sequence has not been initiated, and the process returns to step 212 and continues to wait until either all outstanding transactions have been completed at step 212 or the Fhalt bit has been set to 1 at step 404.

If the Fhalt bit has been set to 1 at step 404, the processor sets the debug mode bit to 1 at step 406. All unacknowledged (incomplete) transactions remaining in the processor's instruction window are then aborted at 408, and the processor reverts to a state associated with an earliest non-acknowledged transaction at 410. This state can be determined, for example, based on an examination of the processor's scoreboard logic, which tracks pending transactions in the processor. The processor then enters debug mode at 214, and the flowchart proceeds to debug processing (e.g., the debug processing steps depicted in FIG. 2). Although the setting of the debug mode bit at 406 is depicted in FIG. 4 as occurring before aborting the unacknowledged transaction at step 408, it is to be appreciated that the debug mode bit may be set after steps 408 and 410 without departing from the scope of this disclosure.

In addition to the features described above, one or more embodiments of the forced halt functionality described herein can also include enhanced processor state logging features to assist a user in determining a root cause or condition that resulted in a hung transaction. To this end, a processor in accordance with one or more aspects described herein can include enhanced scoreboard logic (e.g., scoreboard logic 318 of FIG. 3) that maintains not only a record of a pending transaction dispatched to the instruction window, but also processor state information associated with each pending transaction.

Figure 5:
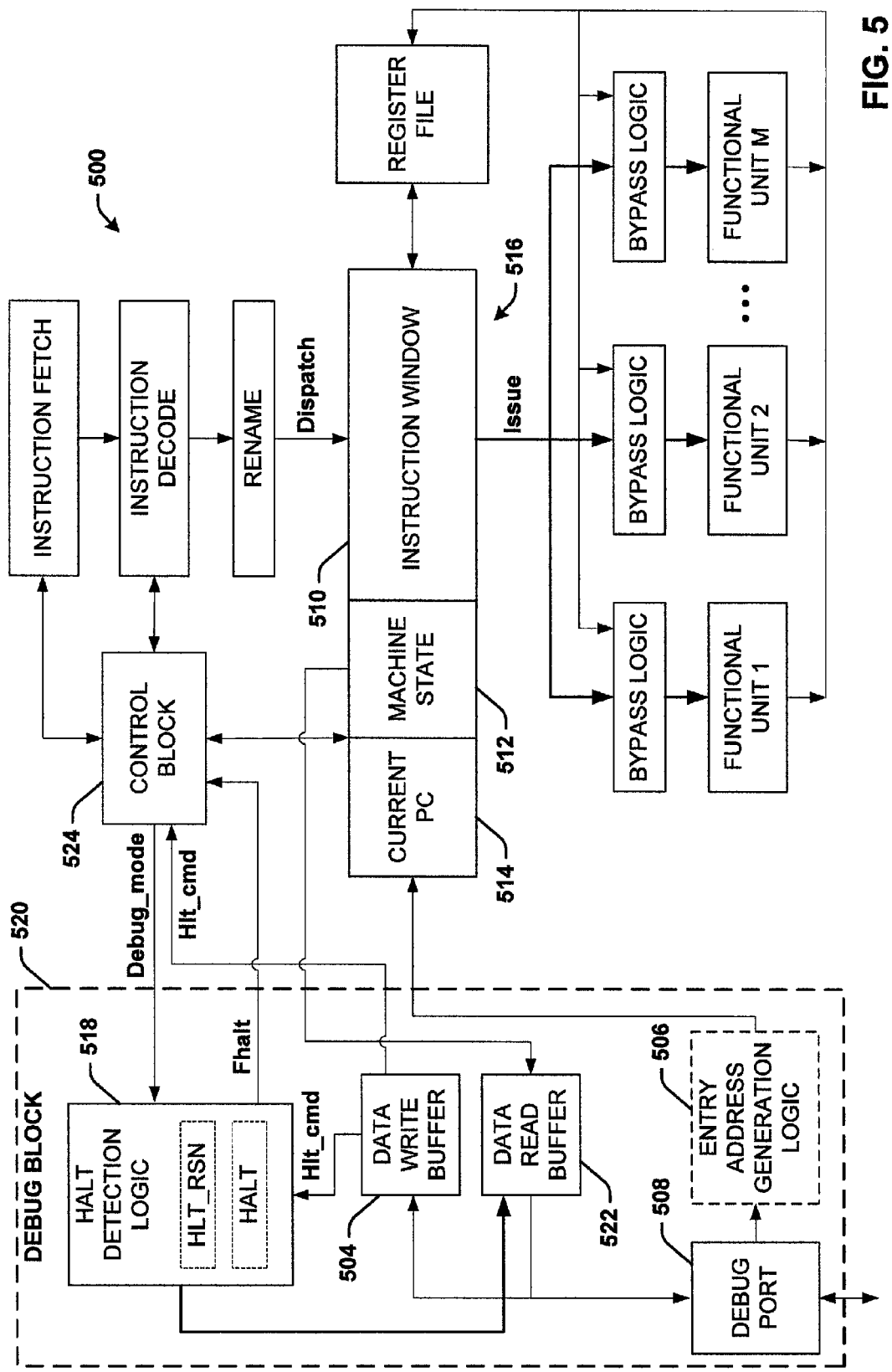
FIG. 5 is a block diagram illustrating an example, non-limiting embodiment of a processor design that supports forced halt functionality and recording of processor states in accordance with various aspects described herein.

FIG. 5 illustrates an example processor system 500 that supports forced halt functionality and recording of processor states in accordance with various aspects described herein. Although the example system 500 of FIG. 5 is depicted as an out-of-order speculative processor design having particular functional elements, it is to be appreciated that aspects of the present disclosure can be incorporated in substantially any type of processor design, and are not limited to inclusion in the types of processor designs described herein. The functional blocks illustrated in FIG. 5 can respectively comprise hardware, software, or a combination of hardware and software implemented as a computer processing device.

Some functional blocks illustrated in FIG. 5 (e.g., control block, instruction fetch, etc.) may be similar to the corresponding functional blocks depicted in FIG. 1, and as such are not discussed further in connection with FIG. 5. Processor system 500 includes scoreboard logic 516 comprising an instruction window area 510 and an associated machine state area 512 and current program counter (PC) area 514. The current PC area 514 and machine state area 512 maintain a current PC and machine state, respectively, for each pending transaction entered in the instruction window area 510. That is, when a new instruction is fetched, decoded, and dispatched, the processor creates an entry in the scoreboard logic 516 for the dispatched transaction comprising the transaction ID and transaction type (e.g., ALU or LSU/Co-processor), as well as additional information regarding the state of the processor at the time the instruction was dispatched. This additional state information can include, but is not limited to, the current PC, the current machine state of the processor (e.g., hypervisor, supervisor, secure, etc.), an operation code (op-code) executed, and/or other such state information. Processing on the dispatched transactions will then proceed as normal, with the instruction window passing the transactions to the functional units for execution. When a functional unit returns an acknowledgement that execution of a pending transaction has been completed, the entry for that transaction (including the transaction's associated state information) will be de-allocated from the scoreboard logic.

In some scenarios (e.g., during testing of a motherboard or SoC that includes processor system 500), the user may wish to halt the processor and place the processor in a debug state so that internal state registers of the processor can be viewed. For example, the user may interface with the processor via a debug port 508 and initiate an external debug event (e.g., a halt command) requesting a halt of the processor and a transition to the debug state. As noted above, when an external debug event is received, the processor typically waits until all pending transactions recorded by the scoreboard logic 516 have completed before transitioning to the debug state. However, in some scenarios, the processor may be unable to complete a pending transaction, resulting in a hung state for that transaction.

To address this issue, processor system 500 can include halt detection logic 518, which can determine whether a pending transaction is hung based on certain system conditions. In one or more embodiments, halt detection logic 518 can detect a hung transaction based on a determination that the processor has not switched to debug mode within a given number of clock cycles after receipt of the halt command. In response to determining that a hung transaction is preventing the processor from transitioning to debug mode, halt detection logic 518 can initiate a forced halt sequence. In one or more embodiments, halt detection logic 518 can initiate the forced halt sequence by pulsing an internal forced halt bit (e.g., the Fhalt bit examined in step 404 of FIG. 4).

As described above, assertion of the forced halt sequence by halt detection logic 518 aborts any pending transactions recorded in scoreboard logic 516 (including the hung transaction), forces the processor into debug mode, and sets the debug_mode register equal to 1. In addition, the previously recorded information for each aborted transaction, including the transaction information stored in instruction window area 510 and the processor state information associated with each aborted transaction stored in areas 512 and 514, is maintained in the processor or in an associated memory while in debug mode for subsequent viewing. During debug mode, the transaction and associated processor state information can be accessed and viewed by the user via debug port 508. For example, debug block 520 of the motherboard or SoC may include entry address generation logic 506 that allows the user to select an entry address of the scoreboard logic 516 containing transaction and state information for the aborted instruction. In response, state data from the selected register is moved to an data read buffer 522 of the debug block 520 for viewing (e.g., on a debugging interface connected to debug port 508). Thus, during debug mode, a record of the processor state at the time the hung transaction was originally dispatched can be accessed and viewed by the user during debug mode to assist in determining the root cause or condition(s) that caused the transaction to hang.

In addition to recording information relating the processor state at the time the transaction was dispatched, one or more embodiments can also maintain information relating to a status of the aborted transaction at the time the forced halt was initiated (e.g., waiting for execution, waiting for acknowledgement, etc.). For aborted transactions that were awaiting completion acknowledgement at the time the forced halt sequence was initiated, some embodiments may also include a record of the particular functional unit responsible for executing the transaction. This information may be useful, for example, if the hung transaction is due to an issue with the functional unit.

Figure 6:
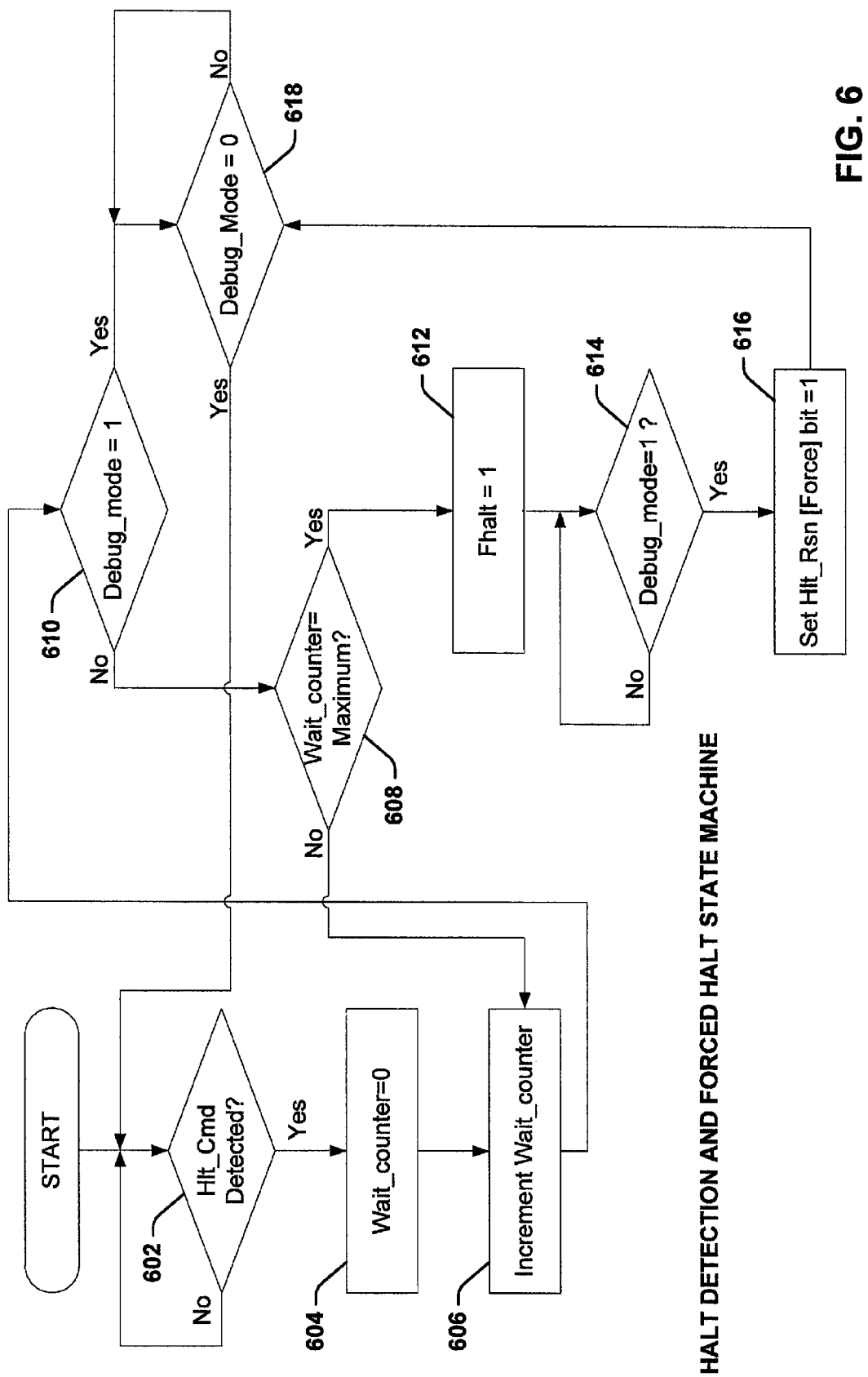
FIG. 6 illustrates an example halt detection and forced halt state machine diagram for an example processor system.

FIG. 6 illustrates an example halt detection and forced halt state machine diagram for processor system 500 of FIG. 5. The machine state flow can begin at 602, where a determination is made regarding whether a halt command signal (Hlt_Cmd) is detected. The halt command signal (e.g., external debug event) can be initiated, for example, using a debugging application connected to debug port 508 of FIG. 5. As shown in FIG. 5, in response to receipt of a halt command from debug port 508, data write buffer 504 provides the Hlt_Cmd signal to halt detection logic 518 and control block 524.

If the Hlt_Cmd signal is detected at 602, halt detection logic 518 will set a wait counter (wait_counter) to zero at 604, and control block 524 will begin waiting for all outstanding transactions recorded in the instruction window area 510 to complete. In one or more embodiments, the wait counter can be a counter that, while active, increments with each pulse of the processor clock, thereby serving as a timer.

Next, the wait counter is incremented at step 606 (e.g., in response to a high transition of the processor clock). The halt detection logic 518 then examines a Debug_mode bit of the processor at 610. The debug_mode bit will be set high when the control block 524 has placed the processor in debug mode after all pending transactions have completed execution. If debug_mode is determined to be equal to 1 at 610, indicating that the processor has successfully completed all pending transactions and has transitioned to debug mode, the state machine flow moves to step 618, where the processor waits for debug_mode to be reset to 0 (indicating that the user has ended debug mode and placed the processor back into normal processing mode). When debug_mode is reset to 0 at 618, normal processing is resumed and the system returns to 602 to await another halt command.

However, if debug_mode is determined to be zero at 610, indicating that there are remaining transactions in the instruction window awaiting completion, halt detection logic 518 determines at 608 whether the wait counter has reached a defined maximum value. If the maximum value has not been reached at 608, the wait counter is incremented again at 606, and debug_mode is examined again at 610. The sequence continues to increment the wait counter until the control block sets debug_mode to 1 at step 610 (indicating that all pending transactions have been completed and the debug state has been achieved), or until the wait counter reaches the maximum value at 608.

The maximum value of the wait counter can be set to any suitable value, and will typically be configured to count through a duration of time longer than an amount of time expected for the processor to complete a full set of transactions in the instruction window 510. In this way, if pending instructions are still awaiting completion after the wait counter has reached this maximum value, it can be reasonably assumed that one or more pending transactions are hung. Accordingly, if it is determined at 608 that the wait counter has reached the maximum value, the halt detection logic will set the forced halt bit (Fhalt) at 612, which initiates the forced halt sequence. For example, as depicted in FIG. 5, halt detection logic 518 can provide the Fhalt signal to control block 524, which causes the control block to initiate the forced halt sequence described above. In response to receiving the Fhalt signal, the control block will abort all pending transactions in instruction window 510, revert the processor to the state associated with the earliest non-acknowledged transaction, and place the processor in debug mode (as described above in connection with FIG. 4).

After setting the Fhalt signal, halt detection logic 518 will monitor debug_mode at 614 to determine when the processor has aborted the pending transactions and transitioned to the debug state. When the processor has successfully completed the forced halt sequence and placed the processor in debug mode, halt detection logic will set a halt reason bit (Hlt_Rsn [Force]), which serves as a record that the processor was force halted because of a possible hung transaction (as opposed to a normal transition to debug mode). The Hlt_Rsn [Force] bit can be viewed by the user while the processor is in debug mode to alert the user of a possible problem. After setting the Hlt_Rsn [Force] bit, the machine state flow moves to step 618 and waits for the user to exit debug mode as described above.

Figure 7:
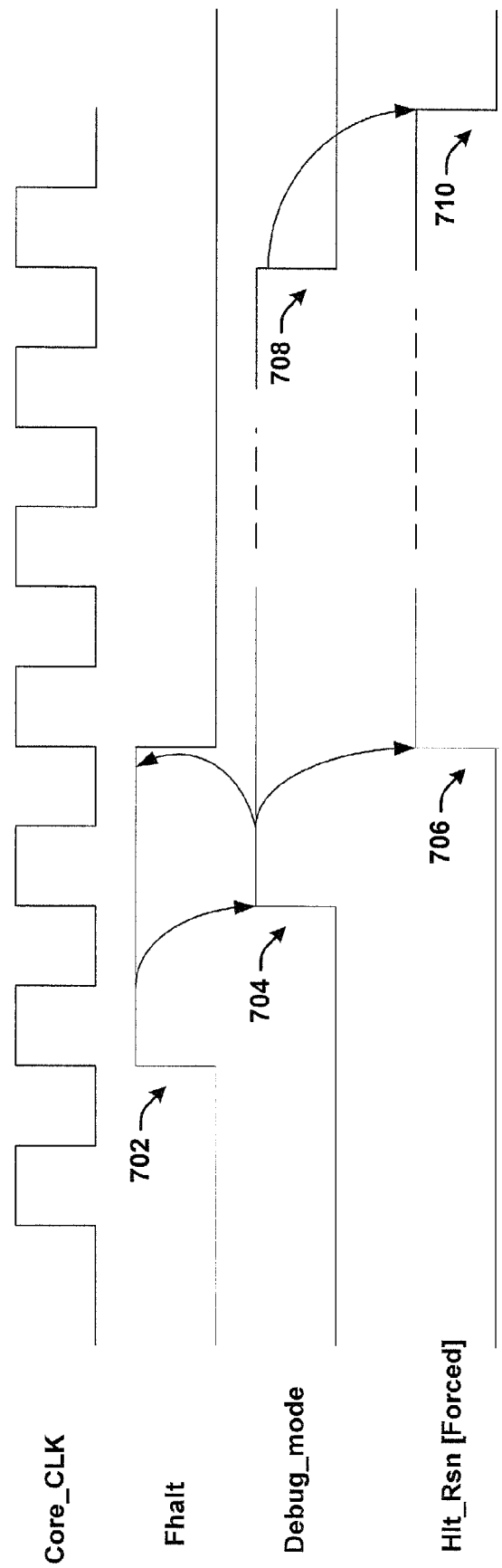
FIG. 7 illustrates an exemplary, non-limiting timing diagram for forced halt, debug mode, and forced halt reason signals in accordance with various aspects described herein.

FIG. 7 illustrates an exemplary, non-limiting timing diagram for the Fhalt, debug_mode, and Hlt_Rsn [Forced] signals described above. As shown in FIG. 7, the signals are synchronized with the processor's clock pulses (core_CLK). In this example, an external debug event has been received requesting that the processor be halted and placed in debug mode, but the debug_mode bit has remained low due to a hung transaction in the instruction window. If the debug_mode signal remains low for a predetermined duration of time after receipt of the external debug event (as determined by the wait counter described above), the halt detection logic pulses the Fhalt bit at 702. Accordingly, the processor's control block will perform the forced halt routine by aborting the pending transaction, forcing the processor into debug mode, and setting the debug_mode bit high at 704. Additionally, the halt detection logic will set the Hlt_Rsn [Forced] bit at 706 so that the system designer is aware that the system was halted abnormally in response to the external debug request. The Hlt_Rsn [Forced] bit will remain high while the processor is in debug mode so that this status can be viewed by the user during debug. When the user exits debug mode, the debug_mode bit will be reset at 708, and, in response, the HLT_RSN [Forced] bit will also be reset at 710.

Figure 8:
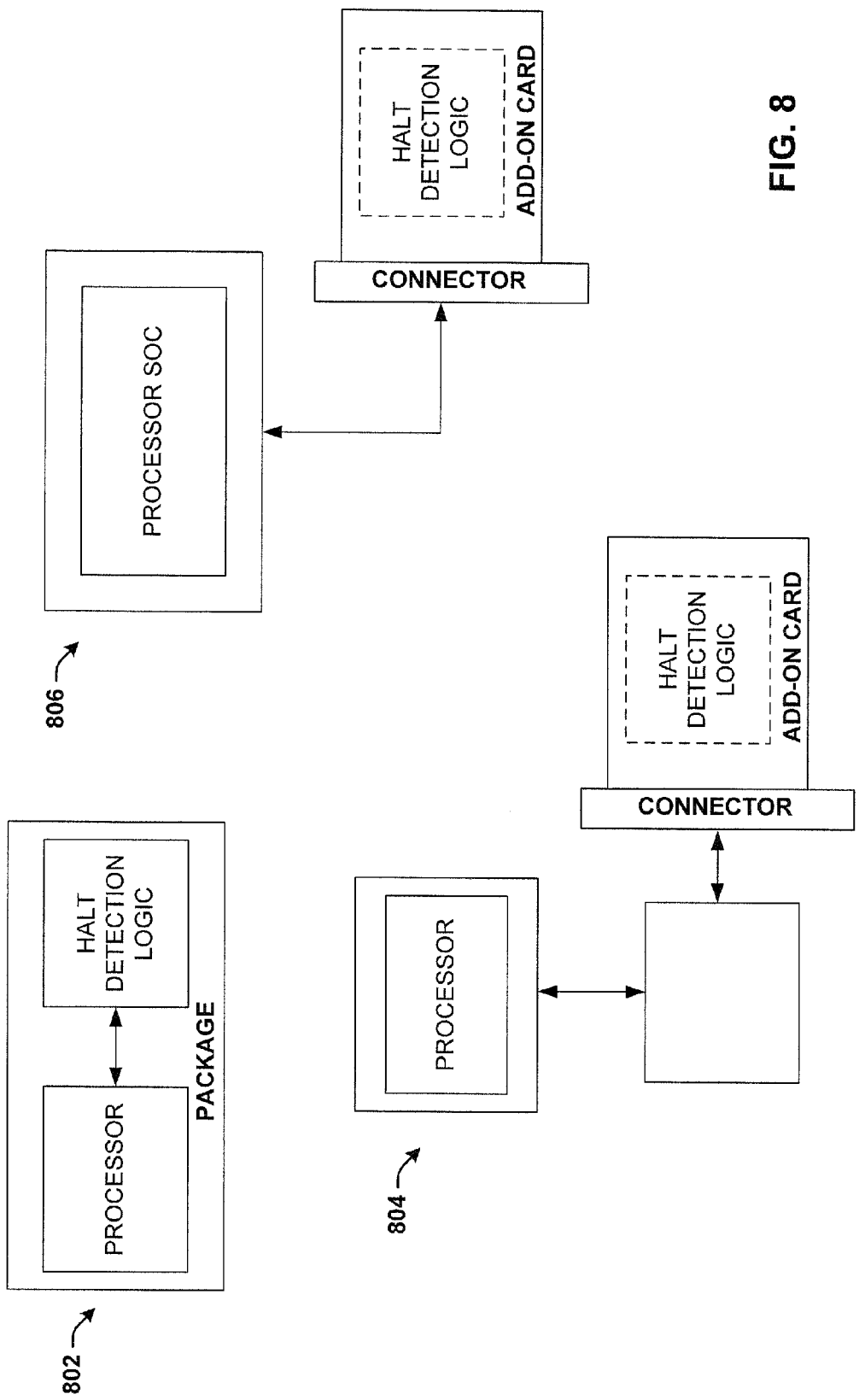
FIG. 8 illustrates exemplary, non-limiting implementations of the halt detection functionality described herein.

Although the foregoing examples have depicted the halt detection logic as being implemented within the processor itself, it is to be appreciated that other configurations are also within the scope of this disclosure. FIG. 8 illustrates other exemplary, non-limiting implementations of the halt detection functionality relative to a processor. For example, system 802 is a package device comprising a processor and a separate component for executing the halt detection logic. In such embodiments, the halt detection logic component can exchange signals with the processer (e.g., Fhalt, debug_mode, Hlt_Cmd, etc.) over a system bus or printed circuit connections to implement forced halt functionality for the processor. In system 804, the halt detection logic is embodied in an add-on card that can be slotted to a motherboard using a suitable connector (e.g., a SCSI connector or other suitable interface). The add-on card can exchange signals with the processor over the motherboard to monitor and control the processor in accordance with the forced halt functionality described above. Similarly, system 806 comprises an add-on card with embedded halt detection functionality that connects to a processor system-on-chip (SoC) to facilitate forced halt functionality for the processor SoC.

Figure 9:
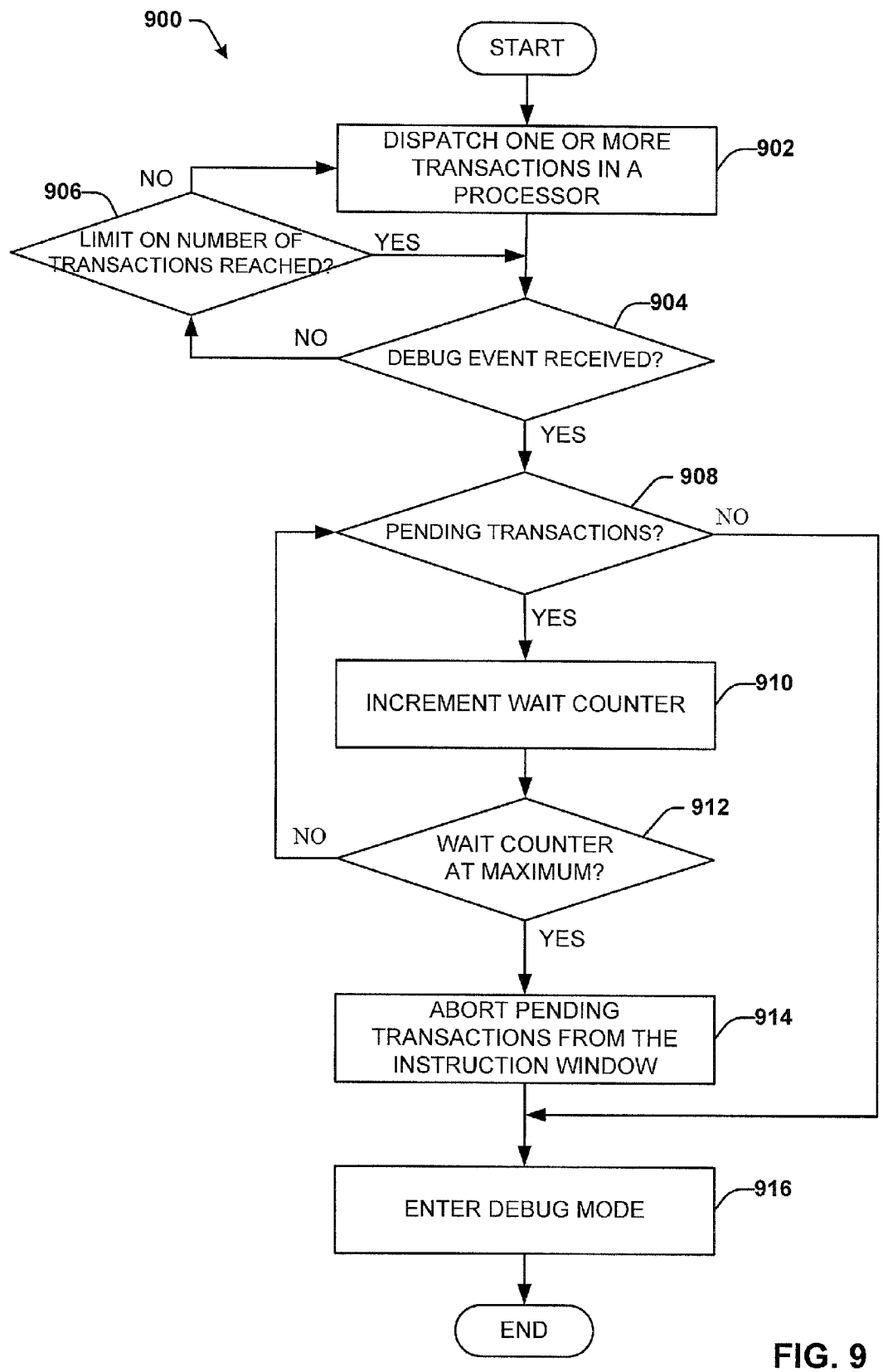
FIG. 9 illustrates a flow diagram of an example, non-limiting embodiment for forcing a processor with hung transactions into a debug state.
Figure 10:
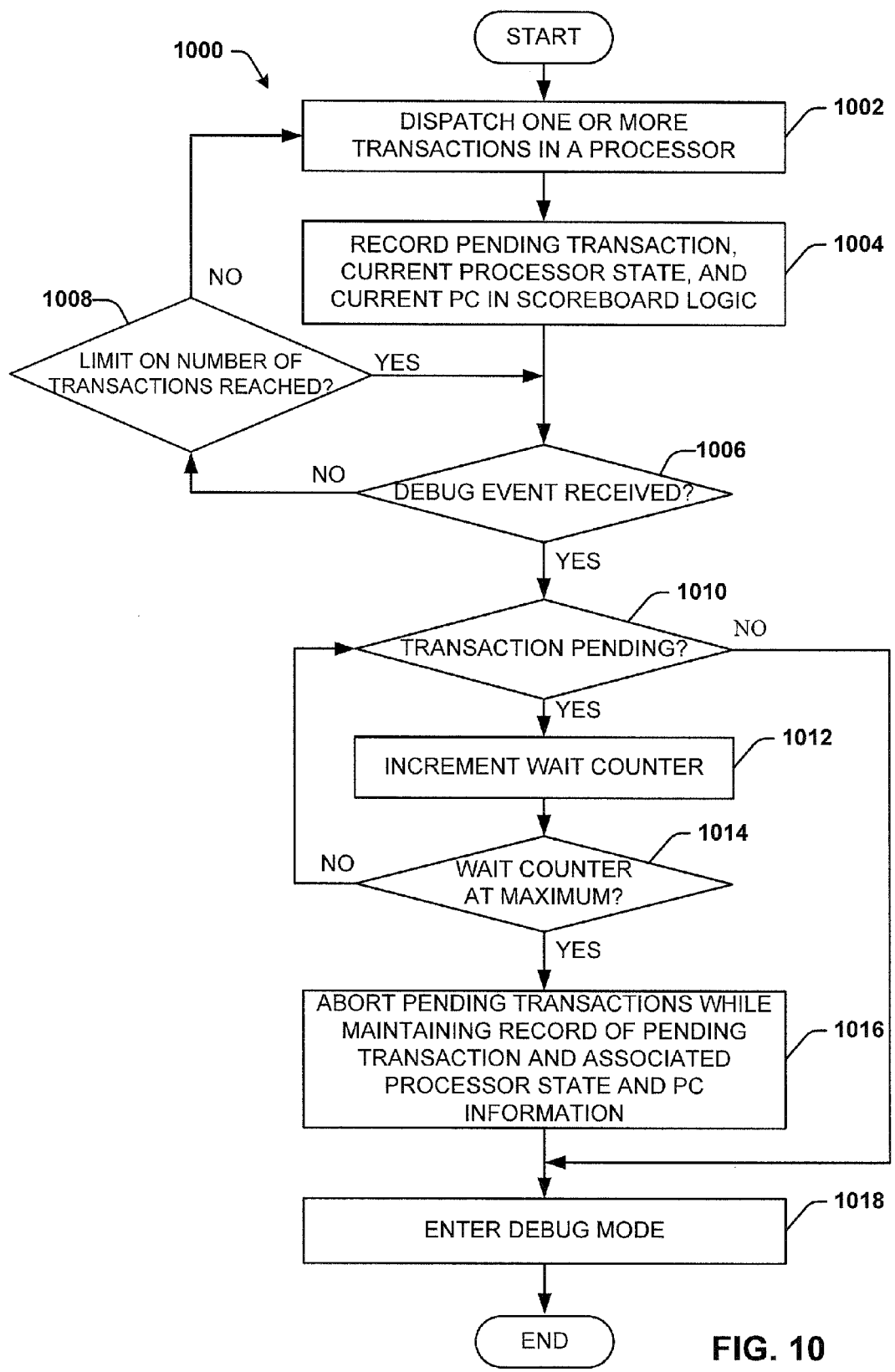
FIG. 10 illustrates a flow diagram of an example, non-limiting embodiment of a method for forcing a processor into a debug state and providing processor state information for debugging purposes.

In view of the example systems described above, methods that may be implemented in accordance with the described subject matter may be better appreciated with reference to the flowcharts of FIGS. 9-10. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 9, a flow diagram of an example, non-limiting embodiment for forcing a processor with hung transactions into a debug state is shown. Method 900 can begin at block 902, where one or more transactions are dispatched in a processor. For example, the processor can fetch an instruction in accordance with a current program counter, decode the instruction, and dispatch the instruction to the processor's instruction window as a transaction to be executed. At 904, a determination is made regarding whether a debug event is received. The debug event can be initiated, for example, by a debugging application interfaced to a debug port of a system that includes the processor. If no debug event is received at 904, a determination is made at 906 regarding whether the limit on the number of pending transactions has been reached. If the limit has not been reached, the methodology returns to 902, where additional transactions may be dispatched. Alternatively, if the limit has been reached at 906, the processor returns to step 904 and awaits a debug event without dispatching additional transactions. The methodology continues to loop between steps 904 and 906 until either a debug event is received at 904 or a determination is made at 906 that the number of transactions is less than the limit (e.g., a pending transaction has completed execution, which has brought the number of pending transactions below the limit).

If a debug event is received at 904, a determination is made at 908 regarding whether there are pending transactions entered in the processor's instruction window awaiting execution or awaiting acknowledgement that the transactions have completed execution. One or more of the pending transactions may include an instruction that is in the process of execution but which cannot be completed for unforeseen reasons, causing the processor to remain in a hung state while waiting for an acknowledgement that the transaction has completed. If there are no pending transactions at 908, the methodology moves to step 906 where the processor enters debug mode and allows a user to view internal state information (e.g., general purpose registers or system registers) for the processor.

Alternatively, if it is determined at 908 that there are pending transactions in the instruction window, a wait counter is incremented at 910. At 912, a determination is made regarding whether the wait counter has reached a maximum value. If the wait counter has not reached the maximum value at 912, the methodology returns to 908 and again checks for pending transactions. The methodology continues to cycle through steps 908-912 until all pending transactions have been completed at 908 (e.g., completion acknowledgements have been received for all outstanding transactions), or until the wait counter reaches the maximum value at 912. If the wait counter reaches the maximum value at 912, a forced halt sequence is initiated. Accordingly, the processor aborts execution of the pending instructions at 914. The processor then enters debug mode at 906.

Referring now to FIG. 10, a flow diagram of an example, non-limiting embodiment of a method for forcing a processor into a debug state and providing processor state information that can be used for debugging purposes is shown. Method 1000 can begin at step 1002, where one or more transactions are dispatched in a processor, as described in previous examples. At 1004, a record is created in the processor for the pending transaction. The record can include information relating to the transaction (e.g., a transaction type, transaction identifier, etc.) as well as information describing the processor state at the time the transaction was dispatched. The processor state information can include, but is not limited to, the current program counter value, the current machine state of the processor (e.g., hypervisor, supervisor, secure, etc.), an opcode executed, and/or other such state information. The transaction and processor state information for the pending transaction can be recorded, for example, in scoreboard logic associated with the processor.

At 1006, a determination is made regarding whether a debug event has been received. If no debug event is received at 1006, the methodology makes a determination at 1008 regarding whether the limit in the number of pending transactions has been reached. If the limit has not been reached, the methodology returns to step 1002, where one or more additional transactions are dispatched. Alternatively, if the limit has been reached at 1008, the methodology continues to loop between 1006 and 1008 until a debug event is received at 1006 or until a determination is made at 1008 that the number of pending transactions is no longer at the limit.

If a debug event is received at 1006, the methodology moves to 1010, where a determination is made regarding whether there are pending transactions recorded in the scoreboard logic. If there are no pending transactions, the methodology moves to step 1018, where the processor enters debug mode and allows a user to view internal states of the processor (e.g., using a debugging application connected to a debug port). Alternatively, if there are outstanding transactions pending at 1010, a wait counter is incremented at 1012. At 1014, a determination is made regarding whether the wait counter has reached a maximum value. If the wait counter has not reached the maximum value at 1014, the methodology returns to 1010 and again checks for pending transactions. The methodology continues to cycle through steps 1010-1014 until all pending transactions have been completed at 1010 (e.g., completion acknowledgements have been received for all outstanding transactions), or until the wait counter reaches the maximum value at 1014. If the wait counter reaches the maximum value at 1010, a forced halt sequence is initiated.

In response to the forced halt sequence being initiated (YES at step 1014), the methodology moves to 1016, where the pending transactions are aborted, while a record of each pending transaction—including the transaction and processor state information recorded at step 1004—is maintained in the processor (or in an associated memory area) for viewing. The processor then enters debug mode at 1018, which allows a user to view internal state information for the processor. This can include allowing the user to view the transaction and processor state information for any aborted transactions recorded at 1004 and maintained at 1016.

Example Computing Environment

Figure 11:
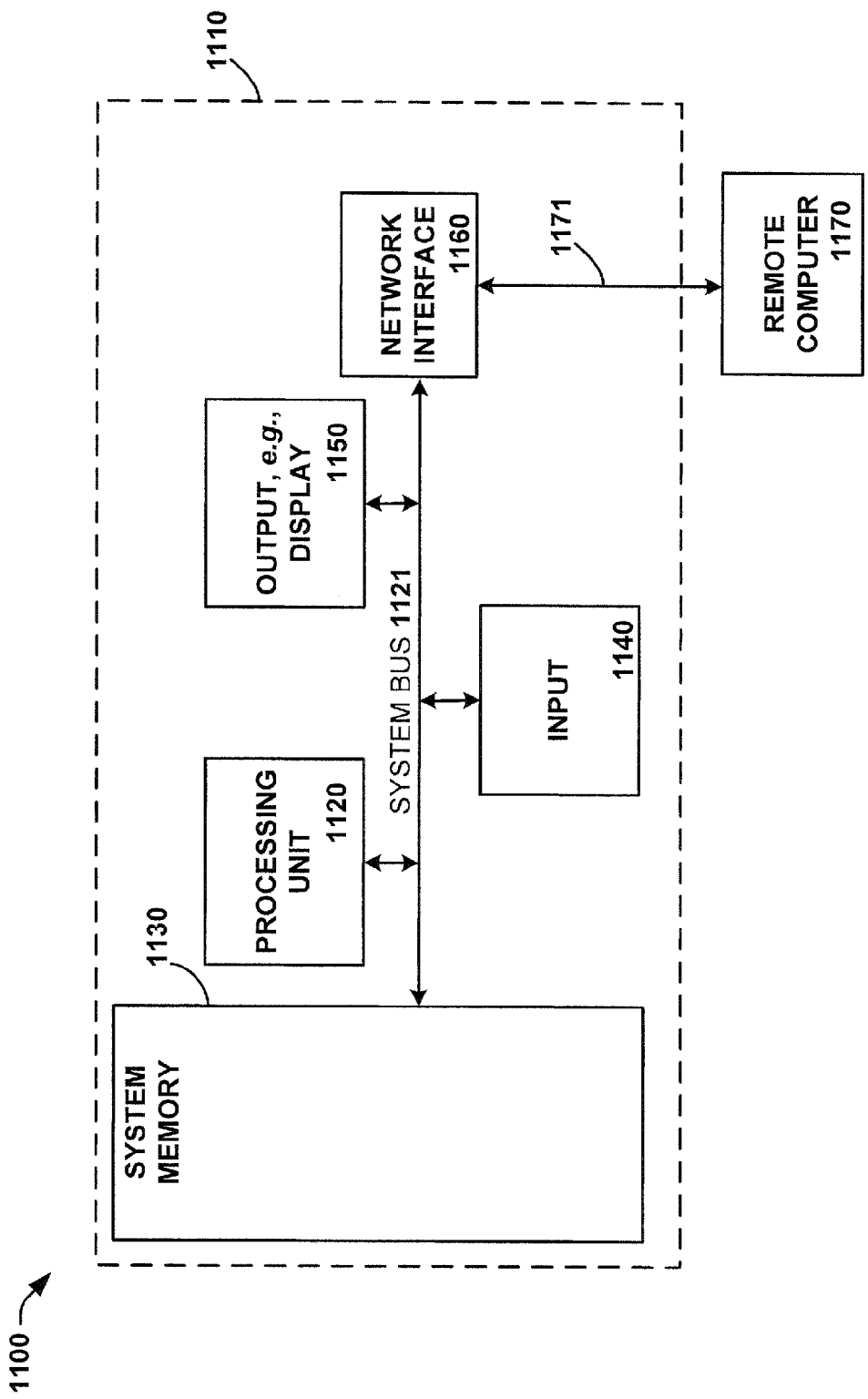
FIG. 11 illustrates a block diagram of an example electronic computing environment that can be implemented in conjunction with one or more aspects described herein.

As mentioned, advantageously, the techniques described herein can be applied to any device where it is desirable to facilitate large receive offload functionality. It is to be understood, therefore, that handheld, portable and other computing devices and computing objects of all kinds are contemplated for use in connection with the various non-limiting embodiments, i.e., anywhere that a device may wish to implement large receive offload functionality. Accordingly, the below general purpose remote computer described below in FIG. 11 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 11 thus illustrates an example of a suitable computing system environment 1100 in which some aspects of the disclosed subject matter can be implemented, although as made clear above, the computing system environment 1100 is only one example of a suitable computing environment for a device and is not intended to suggest any limitation as to the scope of use or functionality of the disclosed subject matter. Neither should the computing system environment 1100 be interpreted as having any dependency or requirement relating to any one or combination of components illustrated in the exemplary computing system environment 1100.

With reference to FIG. 11, an exemplary device for implementing the disclosed subject matter includes a general-purpose computing device in the form of a computer 1110. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures.

Computer 1110 typically includes a variety of computer readable media. Computer readable media can be any available media that can be accessed by computer 1110. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media typically embodies computer readable instructions, data structures, program modules, or other data in a modulated data signal such as a carrier wave or other transport mechanism and includes any information delivery media.

The system memory 1130 may include computer storage media in the form of volatile and/or nonvolatile memory such as read only memory (ROM) and/or random access memory (RAM). A basic input/output system (BIOS), containing the basic routines that help to transfer information between elements within computer 1110, such as during start-up, may be stored in memory 1130. Memory 1130 typically also contains data and/or program modules that are immediately accessible to and/or presently being operated on by processing unit 1120. By way of example, and not limitation, memory 1130 may also include an operating system, application programs, other program modules, and program data.

The computer 1110 may also include other removable/non-removable, volatile/nonvolatile computer storage media. For example, computer 1110 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1121 through a non-removable memory interface such as an interface, and a magnetic disk drive or optical disk drive is typically connected to the system bus 1121 by a removable memory interface, such as an interface.

A user can enter commands and information into the computer 1110 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1120 through user input 1140 and associated interface(s) that are coupled to the system bus 1121, but may be connected by other interface and bus structures, such as a parallel port, game port, or a universal serial bus (USB). A graphics subsystem can also be connected to the system bus 1121. A projection unit in a projection display device, or a HUD in a viewing device or other type of display device can also be connected to the system bus 1121 via an interface, such as output interface 1150, which may in turn communicate with video memory. In addition to a monitor, computers can also include other peripheral output devices such as speakers which can be connected through output interface 1150.

The computer 1110 can operate in a networked or distributed environment using logical connections to one or more other remote computer(s), such as remote computer 1170, which can in turn have media capabilities different from computer 1110. The remote computer 1170 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1110. The logical connections depicted in FIG. 11 include a network 1171, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1110 can be connected to the LAN 1171 through a network interface or adapter. When used in a WAN networking environment, the computer 1110 can typically include a communications component, such as a modem, or other means for establishing communications over the WAN, such as the Internet. A communications component, such as wireless communications component, a modem and so on, which can be internal or external, can be connected to the system bus 1121 via the user input interface of input 940, or other appropriate mechanism. In a networked environment, program modules depicted relative to the computer 1110, or portions thereof, can be stored in a remote memory storage device. It will be appreciated that the network connections shown and described are exemplary and other means of establishing a communications link between the computers can be used.

Example Networking Environment

Figure 12:
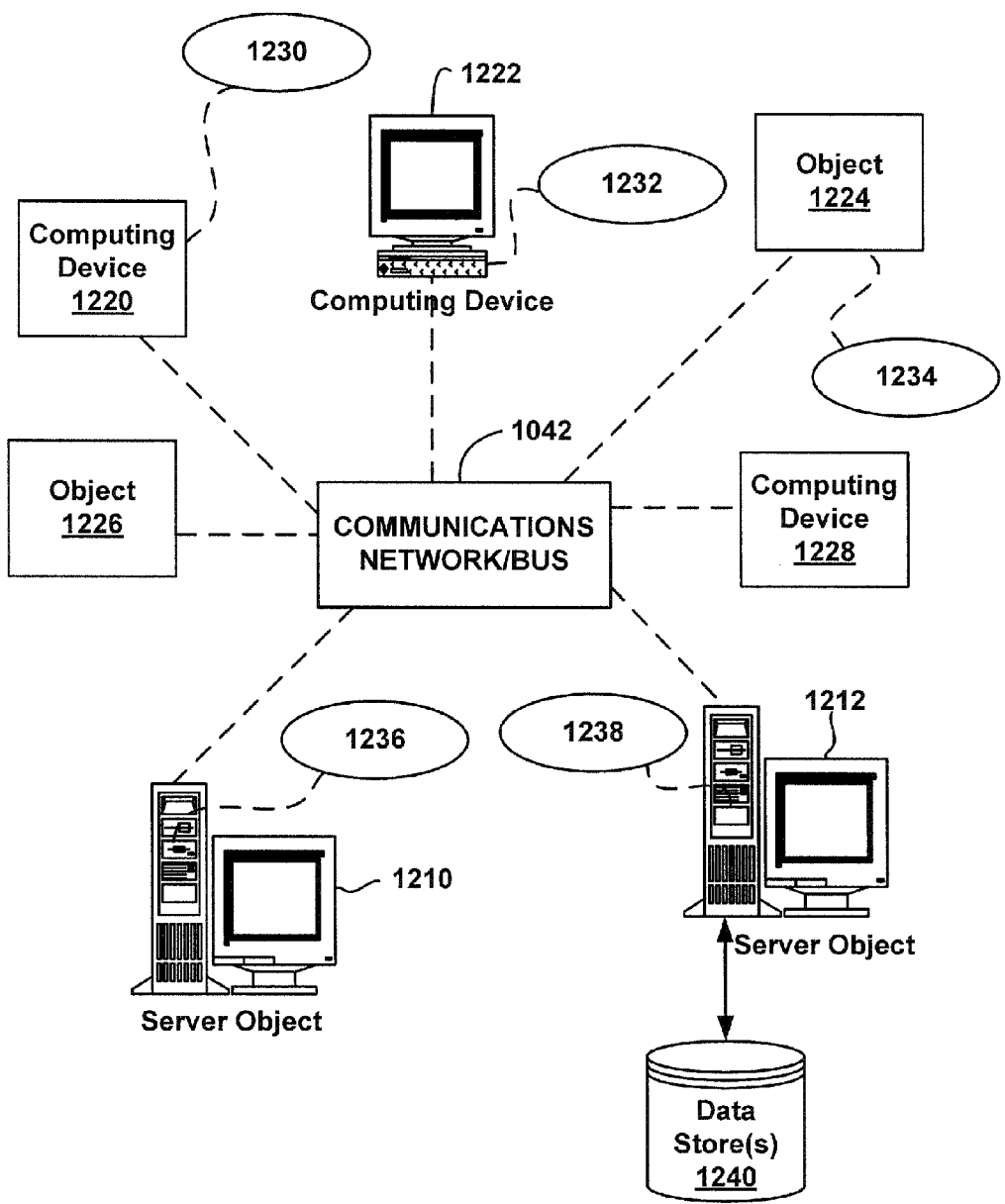
FIG. 12 illustrates a block diagram of an example data communication network that can be operable in conjunction with various aspects described herein.

FIG. 12 provides a schematic diagram of an exemplary networked or distributed computing environment. The distributed computing environment comprises computing objects 1210, 1112, etc. and computing objects or devices 1220, 1222, 1224, 1226, 1228, etc., which may include programs, methods, data stores, programmable logic, etc., as represented by applications 1230, 1232, 1234, 1236, 1238 and data store(s) 1240. It can be appreciated that computing objects 1210, 1212, etc. and computing objects or devices 1220, 1222, 1224, 1226, 1228, etc. may comprise different devices, including a multimedia display device or similar devices depicted within the illustrations, or other devices such as a mobile phone, personal digital assistant (PDA), audio/video device, MP3 players, personal computer, laptop, etc.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1242, either directly or indirectly. Even though illustrated as a single element in FIG. 12, communications network 1242 may comprise other computing objects and computing devices that provide services to the system of FIG. 12, and/or may represent multiple interconnected networks, which are not shown. Each computing object 1210, 1212, etc. or computing object or devices 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc., acting as servers provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1242 or bus is the Internet, for example, the computing objects 1210, 1212, etc. can be Web servers with which other computing objects or devices 1220, 1222, 1224, 1226, 1228, etc. communicate via any of a number of known protocols, such as the hypertext transfer protocol (HTTP). Computing objects 1210, 1212, etc. acting as servers may also serve as clients, e.g., computing objects or devices 1220, 1222, 1224, 1226, 1228, etc., as may be characteristic of a distributed computing environment.

Reference throughout this specification to "one embodiment," "an embodiment," "an example," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "engine," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system, comprising:
 a halt detection component configured to abort a transaction that is pending execution on a processor in response to a determination that the processor has not entered a debug mode within a defined duration of time after receipt of a halt command that instructs the processor to transition to the debug mode, wherein the halt detection component is further configured to initiate at least one of a timer or a counter in response to receipt of the halt command, and to abort the pending transaction and transition the processor to the debug mode in response to a determination that the processor has not transitioned to the debug mode at a time that the at least one of the timer or the counter becomes equal to a defined value; and
 a scoreboard component configured to log an instruction identifier and processor state information associated with the transaction, the processor state information comprising a machine state and a program counter value.

2. The system of claim 1, wherein the halt detection component is further configured to transition the processor to the debug mode in response to the determination that the processor has not entered the debug mode.

3. The system of claim 1, wherein the processor is further configured to create a record of the transaction in a scoreboard logic in response to the transaction being dispatched for execution.

4. The system of claim 3, wherein the halt detection component is further configured to, in response to the determination that the processor has not entered the debug mode, revert the processor to a state associated with an earliest non-acknowledged transaction based on the log of the instruction identifier and the processor state information an examination of the scoreboard logic.

5. The system of claim 3, wherein the record comprises first information that identifies the transaction and second information that describes a state of the processor at a time that the transaction was dispatched for execution.

6. The system of claim 1, wherein the instruction identifier first information comprises at least one of a transaction identifier, type information specifying a type of the transaction, or an operation code of the transaction.

7. The system of claim 1, wherein the halt detection component resides on the processor or resides on a common motherboard with the processor.

8. The system of claim 1, wherein the halt detection component resides on a hardware element that is separate from the processor and communicates with the processor over at least one of a system bus or a hardwired I/O connection.

9. The system of claim 1, wherein the halt detection component is further configured to set an indicator reason bit indicating a possible hung transaction in response to the determination that the processor has not entered a debug mode within the defined duration of time.

10. The system of claim 9, wherein the halt detection component sets the indicator bit in response to completion of a forced halt sequence.

11. The system of claim 1, wherein the scoreboard component logs the processor state information of the processor at a time an instruction associated with the transaction was dispatched.

12. The system of claim 1, wherein the halt command is initiated in response to application of a signal to a forced halt I/O pin of the processor.

13. A method, comprising:
receiving a request to transition a processor to a debug state;
determining that the processor has not transitioned to the debug state within a defined time duration after the receiving the request;
aborting a transaction that is pending in the processor in response to the determining;
recording an instruction identifier and processor state information associated with the transaction, the processor state information comprising a machine state and a program counter value; and
initiating at least one of a timer or a counter in response to receipt of the request to transition; and
aborting the transaction that is pending and transitioning the processor to the debug state in response to the determining that the processor has not transitioned to the debug state at a time that the at least one of the timer or the counter becomes equal to a defined value.

14. The method of claim 13, further comprising instructing the processor to transition to the debug state in response to the determining.

15. The method of claim 14, further comprising setting an indicator reason bit indicating a possible hung transaction in response to the determining.

16. The method of claim 13, wherein the recording creating the record comprises recording at least one of a transaction identifier, a type of the transaction, an operation code of the transaction, a program counter value at a time that the transaction was dispatched, or a machine state of the processor at the time that the transaction was dispatched.

17. The method of claim 13, further comprising:
setting an indicator bit indicating a possible hung transaction in response to the determining that the processor has not entered a debug mode within the defined time duration.

18. The method of claim 13, further comprising:
restoring the processor to a state associated with an earliest non-acknowledged transaction based on the instruction identifier and the processor state information.

19. A system, comprising:
means for receiving a halt command that instructs a processor to transition to a debug mode;
means for determining that the processor has not transitioned to the debug mode within a defined time duration after receipt of the halt command;
means for aborting a transaction that is pending in the processor based on an output from the means for determining;
means for recording an instruction identifier and processor state information associated with the transaction, the processor state information comprising a machine state and a program counter value
means for initiating at least one of a timer or a counter in response to receiving the halt command; and
means for aborting the transaction that is pending and transitioning the processor to the debug mode in response to the determining that the processor has not transitioned to the debug mode at a time that the at least one of the timer or the counter becomes equal to a defined value.

20. The system of claim 19, further comprising means for placing the processor in the debug mode based on the output from the means for determining.

* * * * *